(12) United States Patent
Ramström et al.

(10) Patent No.: US 6,563,281 B1
(45) Date of Patent: May 13, 2003

(54) DEVICE FOR CONTROLLING THE OPERATION OF DRIVING APPARATUS

(75) Inventors: Karl-Gustav Ramström, Västerås (SE); Torgny Brogårdh, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/889,285

(22) PCT Filed: Jan. 18, 2000

(86) PCT No.: PCT/SE00/00090

§ 371 (c)(1),
(2), (4) Date: Jul. 16, 2001

(87) PCT Pub. No.: WO00/43170

PCT Pub. Date: Jul. 27, 2000

(30) Foreign Application Priority Data

Jan. 19, 1999 (SE) ................................................. 9900169

(51) Int. Cl.⁷ .............................. B25J 19/06; B25J 9/18
(52) U.S. Cl. ........................ 318/564; 318/565; 388/903; 388/909
(58) Field of Search ................................ 318/564, 565, 318/434; 388/903, 909

(56) References Cited

U.S. PATENT DOCUMENTS

| | | | |
|---|---|---|---|
| 3,554,084 A | * | 1/1971 | Rasmussen et al. |
| 3,614,401 A | * | 10/1971 | Lode |
| 3,813,990 A | * | 6/1974 | Coppola et al. |
| 4,644,538 A | * | 2/1987 | Cooper et al. |
| 5,107,425 A | * | 4/1992 | Donges et al. |
| 5,697,480 A | | 12/1997 | Herbermann et al. |

FOREIGN PATENT DOCUMENTS

| | | |
|---|---|---|
| EP | 0 889 383 | 1/1999 |
| EP | 0 927 612 | 7/1999 |
| JP | 2-59291 | 2/1990 |
| JP | 11-77580 | 3/1999 |
| JP | 11-282540 | 10/1999 |

* cited by examiner

*Primary Examiner*—Bentsu Ro
(74) *Attorney, Agent, or Firm*—Oblon, Spivak, McClelland, Maier & Neustadt, P.C.

(57) ABSTRACT

A device for monitoring operation of a driving arrangement including at least a servo-mechanism, which includes a regulator, a driving motor controlled by the regulator, and an element which can be set in motion by the driving motor. A detection arrangement detects deviations between intended and actual movement positions of the element and an operation inhibiting and/or alarming arrangement inhibits operation of the driving arrangement and/or starts an alarm when impermissible deviations are detected. The monitoring device includes a redundant driving arrangement, which include at least one auxiliary servomechanism including a redundant regulator, a redundant driving motor controlled by the redundant regulator, and a redundant element which can be set in motion by the redundant driving motor. The regulator and the redundant regulator are connected to an arrangement delivering control information or imparting to the element and the redundant element the same movements or movements having a predetermined relation to each other. The detection arrangement is arranged to detect the deviations concerning the relative position or movements of the element or an object connected thereto, and the redundant element.

25 Claims, 9 Drawing Sheets

DEVICE FOR CONTROLLING THE OPERATION OF DRIVING APPARATUS

FIELD OF THE INVENTION

The present invention relates to a device for monitoring the operation of a driving arrangement according to the preamble of the subsequent claim 1. As will be more closely described hereinbelow, it is preferred that the driving arrangement forms part of a manipulator, in particular an industrial robot, so that the element which can be set in motion by the driving motor forms a manipulator element of the manipulator.

PRIOR ART

The safety systems of the industrial robots of today are not sufficient for allowing people to work within the operating range of an industrial robot when the robot executes its programs. This is due to the fact that there is a large likelihood that an error in the electromechanics of the robot can cause robot movements that can injure or kill people in the vicinity of the arm system of the robot. The accidents, which can ensue, are due to the fact that the robot makes unexpected programmed movements or that the robot rushes owing to measuring or driving system errors. The injuries which can ensue in that connection are either that the robot gives the person in the operating range a strong blow or injuries caused by clamping. The cases when the head it subjected to these injuries are of course particularly serious.

Today it is presupposed that people are not allowed to be within the operating range of industrial robots when the robots execute production programs at full speed, and therefore the safety systems are today only aimed at minimizing the damages to the robot, surrounding equipment and work objects. Consequently, model based monitoring is used in order to continuously compare motor moments and motor position of the robot axles with moments and positions of a model of the robot. A more simple type of monitoring uses the control errors in the servos which are controlling the position and the velocity of the axles, and the magnitude of the moment references generated by the regulator or the current controlling devices of the motors. Furthermore, the motor currents and the motor temperature are often monitored.

When the monitoring in the robot systems of today indicate an error during the axle manoeuvre, a digital output signal is generated from a computer card to a relay, which is connected to a breaker, which disconnects the current to the motors of the robot and makes sure that the brakes of the robot are activated. The reason why these safety concepts are not sufficient is that many functions must work simultaneously in order for the motors of the robot to, with sufficiently large likelihood, always become immediately currentless in connection with a frightful situation. For instance, the software and hardware have to work in the processor which detects the condition of error. Thereupon, the software and hardware for the processor which signals the condition of error to a digital safety output also have to work, as well as the relays and breakers which are to make sure that the motor currents disappear as soon as possible.

If the error is due to the fact that the computer, which is to indicate the error, or the interface towards driving devices and measuring systems of this computer is not working, there is the risk that the error situation will not at all be detected and the driving system can make the robot rush without any control. If the error is due to the fact that a person has been clamped up between the robot and the surrounding equipment of the robot, there is the risk that the monitoring with subsequent software and hardware signalling and relay handling will take so long time that too high clamping forces have time to develop before the motors are cut off. In the same way, there is a great risk that too strong forces have time to develop between the robot and the person in case of a collision at the normal programmed robot velocity. Even though an advanced model-based collision detection is used, there is a risk that the direction of the motors will reverse too late or that some error in the software or hardware will make that the robot will not stop at all.

PURPOSE OF THE INVENTION

The purpose of the present invention is to achieve a monitoring device, by means of which a substantially improved safety in the monitoring is to be attained.

Preferably, it is intended that the risk of injuries when someone is within the range of the driving arrangement, in particular a manipulator, will be so small that it can be generally accepted to work together with a manipulator or an industrial robot.

BRIEF DESCRIPTION OF THE INVENTION

According to the present invention, a very safe monitoring device is achieved as a consequence of the redundant driving arrangement in accordance with the subsequent characterizing part of claim 1, the high safety being attained in that the detection arrangement is designed to detect the deviations concerning the relative positions or movements between the driven element and the redundant element.

Manipulators or robots having this safety system will be able to work together with human beings, for instance during assemblage of different work shop technical products and disassembly of corresponding products for material recycling. With the inventional monitoring device, manipulators, in particular robots, can be introduced on different places in an assembly line for motor cars without having to be surrounded by fences obstructing the motor car assemblers in the operating range of the manipulators or robots. This opens up new possibilities for automatization of the assembly of private cars, lorries and busses, which today is almost entirely manual. This gives a great flexibility and the possibility to robotize afterwards an existing manual assembly line.

Further features and embodiments of the inventional device are related to in the dependent claims.

BRIEF DESCRIPTION OF THE DRAWINGS

With reference to the subsequent drawings, a closer description of embodiments of the invention given as examples will follow below.

In the drawings.

DETAILED DESCRIPTION OF PREFERRED EMBODIMENTS

Figure 1:
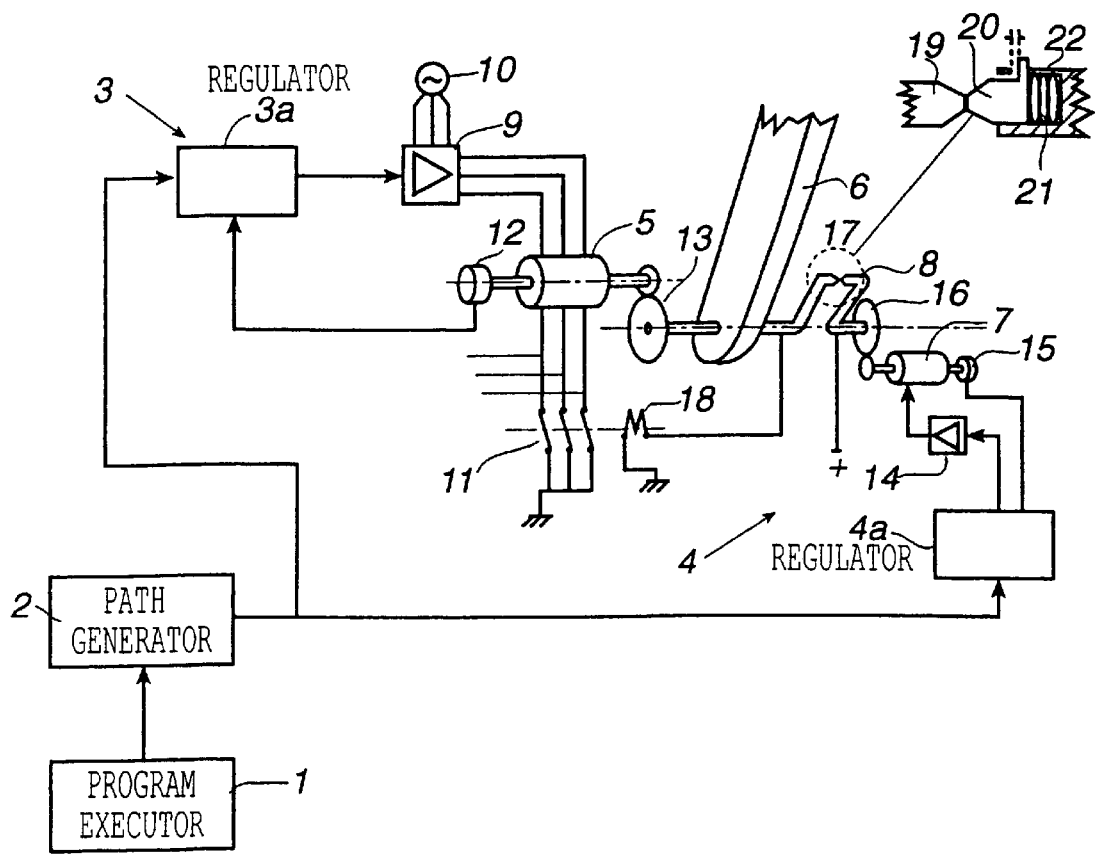
FIG. 1 is a schematic view illustrating a first embodiment of the inventional monitoring device.

FIG. 1 shows a possible embodiment of the safety system embraced by this invention. The program executor 1 generates programmed path positions to the path generator 2, which carries out interpolation between these path positions and generates references in the form of motor angles to be used by the servo of the control system. According to FIG. 1, the servo frequencies generated by the path generator 2 are sent to two separate servomechanisms 3 and 4, namely the regulators 3a and 4a, respectively, of the servomechanisms. The regulator 3a is the one which controls the motor 5 that is driving the associated element 6, which here is formed as a revolving robot arm, whereas the regulator 4a is a redundant regulator controlling the redundant motor 7, which in this embodiment is driving a redundant element 8, here an arm. The motor 5 is controlled by the regulators via the driving device 9, and are connected to a three-phase voltage source 10 via the contactor 11. On the axle to the motor 5, there is an angle sensor 12, which is measuring the motor angle for feedback to the regulator 3. Between the motor 5 and the arm 6 there is a gear unit 13. The motor 7, which only needs to generate a fraction of the moment generated by the motor 5, is driven by the driving device 14, has the angle sensor 15 and the gear unit 16. The arm 8 is in mechanical contact with an arm 17, which is mounted on the arm 6. The contact between the arms 17 and 8 are obtained via two points 19 and 20, where the point 20 is pressed against the point 19 by a spring 21, which is located in a sleeve 22 of the arm 8.

During normal operation of the robot, the servomechanisms 3 and 4 will position the points 19 and 20, respectively, in such a way that these will stand directly in front of each other and the breaker coil 18 will hold the breaker 11 drawn so that the motor 5 can operate. However, if the arm 17 is not moving in exactly the same way as the arm 8, the contact between the points 19 and 20 will be broken and the breaker 11 will immediately make the motor 5 currentless. In that connection, there is relay logic (not shown in the figure), which entails that all the motors of the robot will become currentless, that the brakes will be actuated and that the robot will not restart without an operator controlled restart.

With the safety system according to FIG. 1, all the errors in the servo 3, driving device 9, motor 5, gear unit 13, supply voltage 10, measuring sensor 12, cabling, hardware and software will immediately result in that the points 19 and 20 will be separated, which entails that the current is disconnected from all the motors without any risk that hardware and software will fail to detect and signal the error via digital outputs and relay connections to the breaker 11. The safety system also entails that the points 19 and 20 will be separated if the movement of the arm 6 is obstructed during its programmed movement, which results in that the robot motors immediately will be disengaged and will become currentless.

The only possibility of missing a condition of error would be if two errors occur simultaneously, one error in the servo 3 with associated electronics and one error in the servo 4 with associated electronics, and that these errors would make the points 19 and 20 move with the same velocity in the same direction. The likelihood that two such errors should occur is non-existent, since the mass inertia of the real arm 6 is much larger than the mass inertia of the redundant arm 8. This results in that, in case of errors in the servo 3 as well as the servo 4, the arm 8 will react with a shorter time constant than the arm 6 and the points 19 and 20 will separate during the transient movements which immediately are obtained due to both errors.

In order to further reduce the forces which can develop at the collision between robot and human being or when a human being is clamped between the robot and its surroundings, the servo 3 can be model-controlled and trimmed for low stiffness, which results in that external forces on the arm 6 rapidly cause angular misalignments of the arm and thereby that the points 19 and 20 will be separated. In order to further increase the safety in this case, the weakness in the servo can be supplemented with or replaced by a mechanical weakness, e.g. in the form of a torsion spring, between the motor 5 and the arm 6.

Furthermore, it has to be pointed out that the robot should be designed for a minimal movable arm mass and that the maximal angular velocity is fixed with regard to the maximal allowable collision forces at collision robot-human being. The maximal angular velocity is defined for the servo 3 as well as the servo 4, whereby the risk of overspeed will be non-existent.

ALTERNATIVE EMBODIMENTS

The safety concept according to FIG. 1 can be implemented in several ways depending on the desired safety level, cost and adaption to robot construction. What can be varied is the detection principle for deviation between the real arm 6 and the redundant arm 8, the design of the mechanics which connects the redundant arm 8 to the real arm 6, and the location of the redundant arm 8 in the transmission from the motor axle (of the motor 5) and the arm 6.

Figure 2:
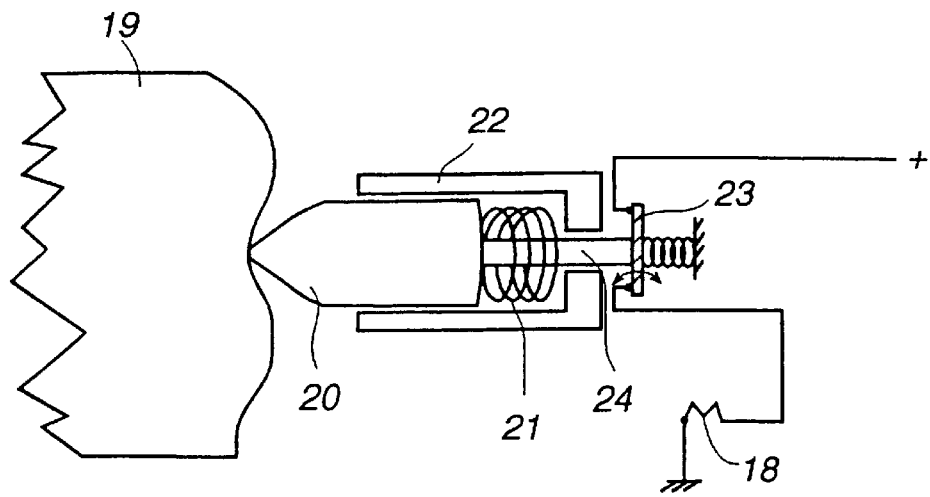
FIG. 2 is an enlarged detail view illustrating a possible embodiment of a safety contact.

When it comes to the detection principle, two contact points according to FIG. 1 constitute one of the most simple and most direct methods for determining if the arm 6 and the redundant arm 8 are moving synchronously. If only a mechanical contact is used between the real and the redundant arm, there are then many possibilities to connect a movement of one or both of the points in FIG. 1 to a separate electromechanical contact. An example of this is shown in FIG. 2, where the point 20 via the pin 24 is mechanically connected to a spring loaded contact 23, which is connected to the coil 18 of the breaker 11. The contact 23 in FIG. 2 is in principle a binary position sensor, and such a sensor can of course be implemented in many different ways, e.g. by use of an electro-optical read fork, a capacitive sensor, an inductive sensor or an ultrasonic sensor. In those cases where the sensor is of non-contact type, this can of course be used directly for detecting deviations between the real arm and the redundant arm. Consequently, FIG. 3 shows an example of how a non-contact sensor 25 can be used for measuring the position of the redundant arm 8 in relation to the position of the real arm 6.

The sensor 25 is measuring against a target 27 on the real arm 6, but the sensor and the target can of course change places. From the measuring transducer 26 a signal S is obtained, which signal depends on the deviation between the arms 6 and 8. In the comparator 29 S is compared with $S_{ref}+\Delta S$ and $S_{ref}-\Delta S$ and as long as the signal S is within the interval $[S_{ref}-\Delta S, S_{ref}+\Delta S]$ the output of the comparator is high and the driving circuit 30 gives a high signal, which implies that the coil 18 of the breaker 11 is holding the breaker closed. However, if S leaves the allowed signal interval the motor currents are immediately broken and the brakes will be activated. However, there is now a risk that the sensor 25, measuring transducer 29 or driving circuit 30 will receive such an error that the breaker 18 will remain closed despite the arms 6 and 8 deviating in an angle in relation to each other. In order to decrease this risk, a high-frequency test signal $s_t$ is introduced from the oscillator 28. This signal is added to the position frequency of the servo 4 and entails that the signal S is going to have a high-frequency component. The comparator 29 and the driving circuit 30 are constructed in such a way that the high-frequency signal reaches the breaker circuit with the coil 18. Here the high-frequency signal is detected by means of a phase-sensitive demodulator 32, the output of which is supplied to a further comparator 33, which is also connected to the coil 18. If any error will now occur in the servo 4, motor 7, sensor 15, driving circuit 14, sensor 25, measuring transducer 26, comparator 29 or driving circuit 30, the signal filtered by the band pass filter 31 will immediately change and the comparator 33 will make sure. that the breaker 11 will open and that the motors will become currentless.

Figure 3:
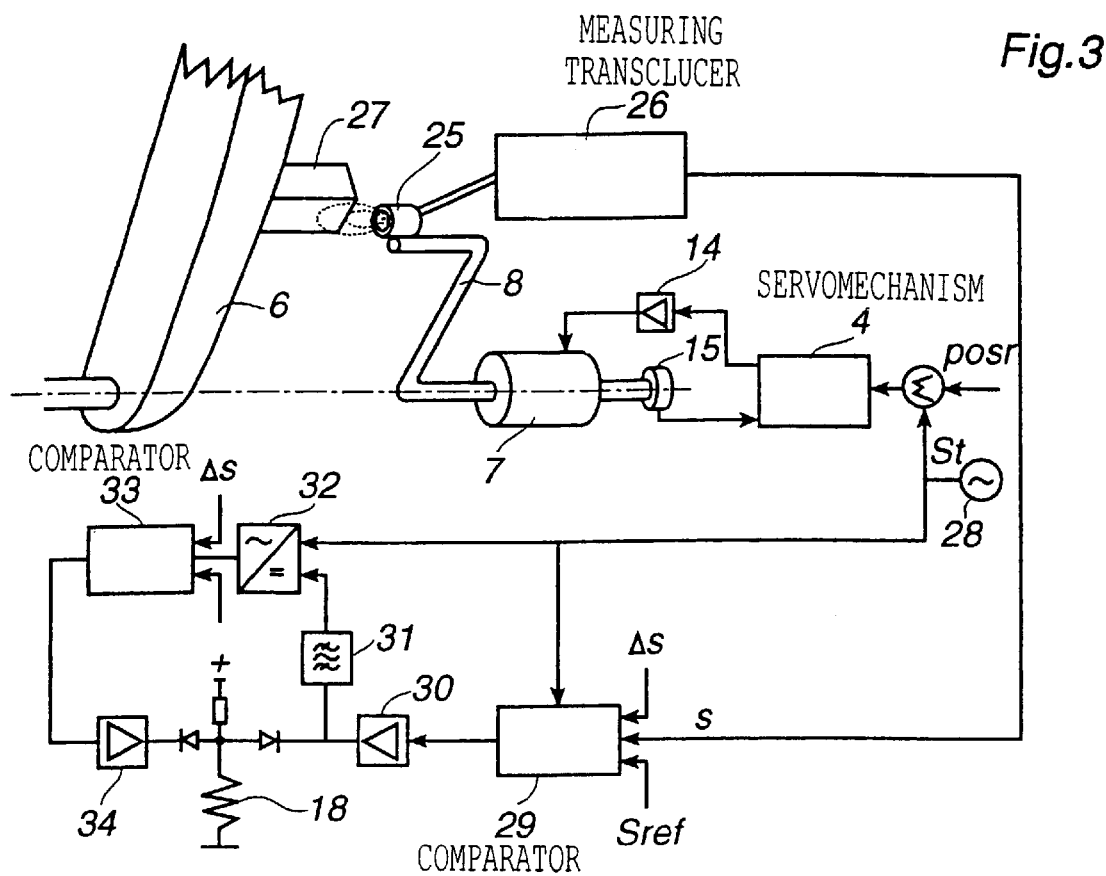
FIG. 3 is a detail view illustrating an alternative embodiment of the invention with non-contact measuring.
Figure 4:
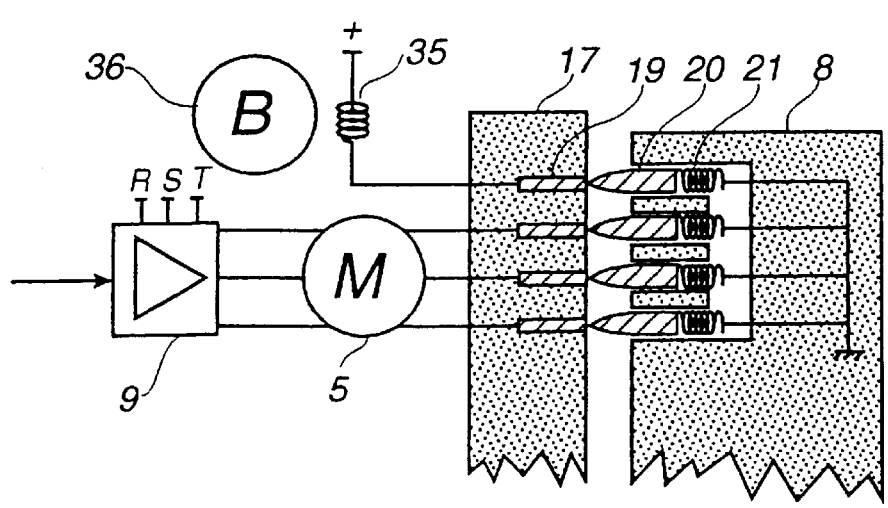
FIG. 4 is a detail view illustrating an embodiment of the detection arrangement.

As can be seen, the safety system with a sensor according to FIG. 3 will be more complicated and also less safe than a system with a direct electrical contact member according to FIG. 1. The contact member in FIG. 1 has been accomplished as points 19 and 20, which is not necessary. It is also possible to use e.g. a point against a conductive electrode surrounded by insulating areas according to FIG. 4. Furthermore, in FIG. 4 the possible risks that a breaker can get stuck in closed position have been eliminated by making the contacts in the redundant arm conduct the motor current directly, as well as the current to the holding circuit 35 of the brake 36. Consequently, the three phases from the motor 5 pass three of the electrodes 19 and the points 20 on the way to a common ground. The brake coil 35 is in the same way connected to ground and a total of four electrodes 19 is obtained in the insulator 17 connected to the real arm and four points in the redundant arm 8, which is partly made of insulating material.

The electrodes 19 and the points 20 can of course change places and there are many ways of connecting the contact pairs 19/20 in the motor circuit. If strong brakes are provided, there is also the possibility of activating the brakes only with the redundant servo 7 and making the motor monitoring see that the motors are made currentless.

Figure 5:
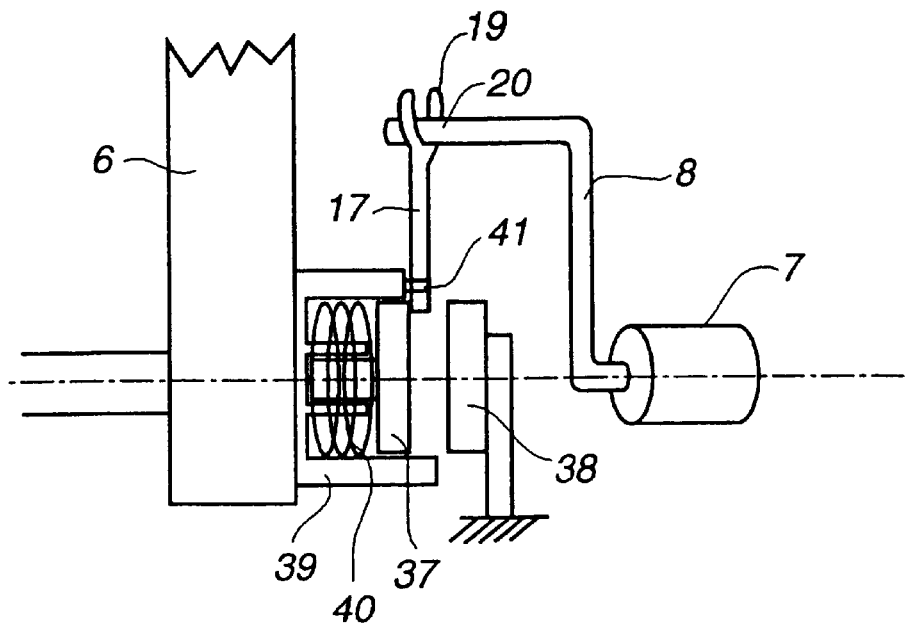
FIG. 5 is a detail view illustrating a brake arrangement for the driven element 6.

In FIG. 5 it is shown that it is also possible to activate the brakes without any electrical holding circuit being connected to contact pairs between the real and redundant arm. Instead, a completely mechanical holding of the spring loaded brake disc 37 is used. This brake disc is located in the brake mechanism 39, which holds the brake disc 37 and the preloading spring 40. When the redundant arm 8 deviates from the position of the real arm 6, the beam 20 in the yoke 19 will turn the arm 17 around its attachment point 41, which is journalled in bearings, and the brake disc 37 will be released and be pressed against brake blocks 38, whereby the real arm is locked. The mechanical method for holding the brake can of course be carried out in many different ways and instead of a brake some type of lever can be used, which is pushed into a fixed mechanical stop when the redundant arm 8 deviates from the real arm 6.

Figure 6:
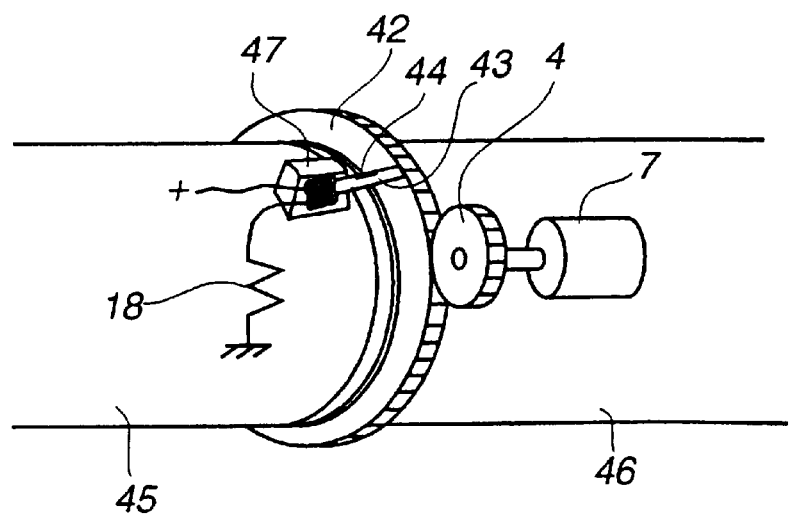
FIG. 6 is a detail view illustrating an alternative embodiment of the driven auxiliary element and the detection arrangement.

In FIGS. 1, 3 and 5, the contact point 19, 20 and 25, 27 is positioned between the redundant and the real servo by means of arms 8 and 17. The function of these arms can of course be carried out by other mechanical solutions. For instance, FIG. 6 shows a construction suitable of being mounted on e.g. the wrist axles of a robot. The wrist mechanism is for the axle in FIG. 5 carried out in such a way that the pipe 46 is turned in relation to the pipe 45 when the corresponding motor is operating. A carbon rod holder 47 with two spring-loaded carbon rods 44 is mounted on the pipe 45, the carbon rods being connected to the relay coil 18 of the motor breaker. On the pipe 46 a ring is journalled in bearings. This ring can be rotated around the pipe 46 by the redundant motor via the gear wheel 4. The motor 7 is mounted on the pipe 46. The ring 42 is made of insulator material, at least on the surface against which the carbon rods 44 are pressed. On the electrically insulated surface of the ring 42 there is a narrow electrically conducting rectangular surface, which short-circuits the carbon rods 44. When the axle 46 is turned in relation to the axle 45, the redundant motor 7 will turn the ring in the opposite direction, so that the conducting surface 43 holds the rods 44 short-circuited and thereby the motor breaker closed.

Figure 7:
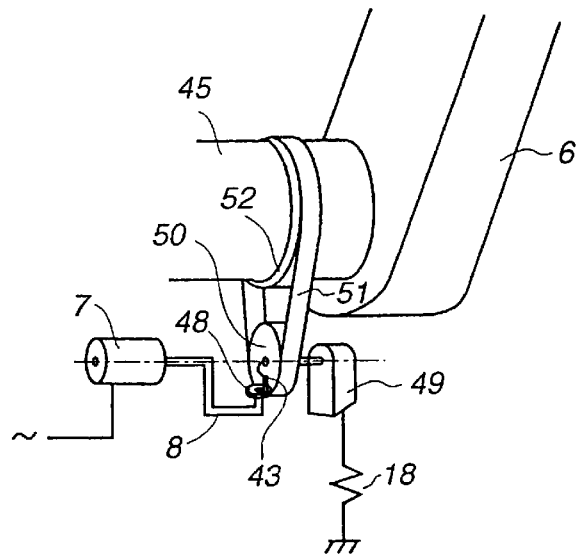
FIG. 7 is a view illustrating an alternative detection arrangement based on a belt transmission between the driven element and the auxiliary element.

The redundant arm does not have to meet directly against the real arm, on the contrary, in constructions with lack of space, the movements of the real arm can be transferred to an extra axle via e.g. a belt transmission according to FIG. 7. Here the real arm 6 is turned by the axle 45, on which a drum 52 for the belt 51 is fixed. The belt transfers the turning of the axle 45 to the belt wheel 50, which is journalled in bearings in the housing 49. The belt wheel 50 is electrically insulating, at least on the surface facing the motor 7. On the insulated surface there is a small electrically conducting surface 43, which is in contact with the bearing housing 49. The redundant motor 7 has its centre of rotation coinciding with the centre of rotation of the belt wheel 50, and the motor positions the contact wheel 48 by means of the arm 8 so that the contact wheel keeps electrical contact with the conducting surface 43. The breaker coil 18 will thereby receive its holding current via motor bearings, motor axle, the redundant arm 8, the contact wheel 48, the axle of the belt wheel and the bearing housing 49.

Figure 8:
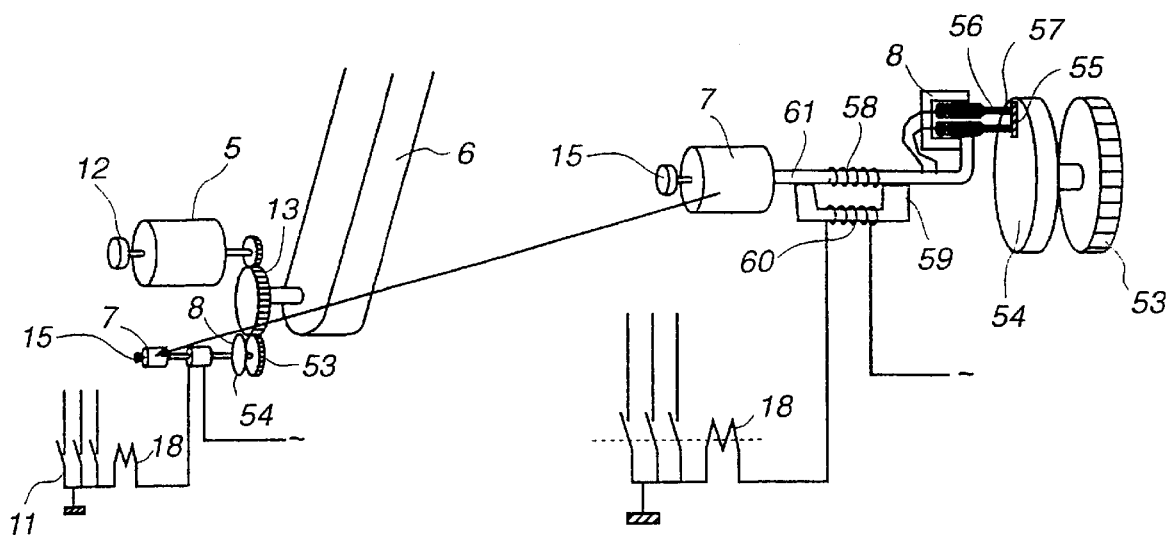
FIG. 8 shows a further alternative of a detection arrangement comprising a gear unit.

The contact point for current breaking to the coil 18 can be connected to different components in the transmission between the motor 5 and the arms 6. For instance, the redundant motor 7 can turn the arm 8 in relation to a contact point being directly turned by the motor 5. In FIG. 8 another variant is shown, where the redundant motor is integrated with the gear unit. An extra gear wheel 53 is connected to the gear wheel 13 in the gear unit, which extra gear wheel turns a plate 54, on which contact points are provided. The redundant motor 7 turns the axle 61, on which the redundant arm 8 is mounted. On the redundant arm 8 there are two spring-loaded electrodes 56 and 57, which are connected to the coil 58. A core 59 of iron or ferrite is magnetically connected to the coil 58 via air gaps and the axle 61 made of magnetic material. The core 59 is provided with a coil 60, which functions as a primary coil to the air gap transformer with the secondary coil 58. The primary coil 60 is connected to the breaker coil 18 and controls the alternating current depending on whether the secondary coil is short-circuited or open. During normal operation, the secondary coil is short-circuited via the metal surface 55 on the plate 54, the remaining part of which is insulating.

Figure 9:
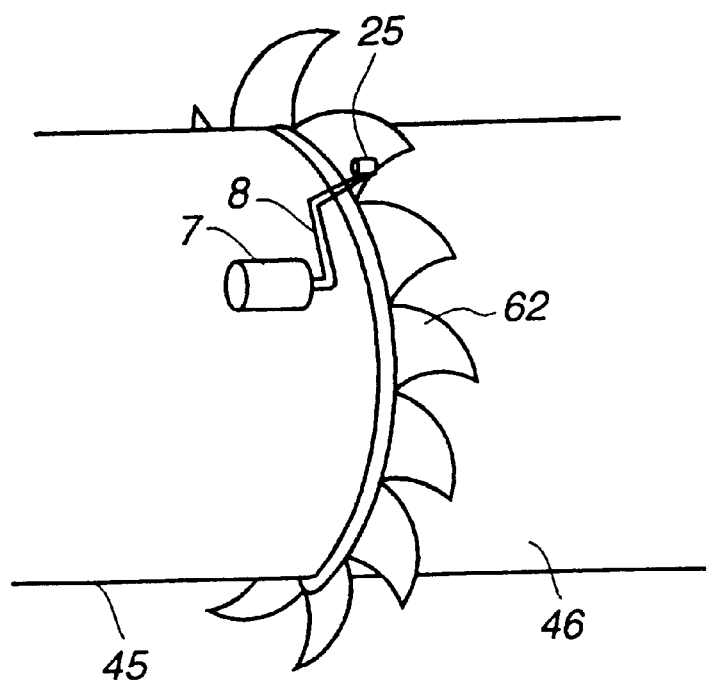
FIG. 9 is a detection arrangement illustrating that objects following each other can have very different designs.

Besides the contact point carrying out circular motions, it is also possible to use a construction where the redundant arm carries out scanning motions in a predetermined pattern. An example of this is shown in FIG. 9. During rotation of the axle in question, the pipe 46 will in the same way as in FIG. 6 move in relation to the pipe 45. On the pipe 46 a collar 62, e.g. of metal, is rigidly mounted, which collar has a sawblade-like profile. The redundant motor turns the redundant arm 8 with the non-contact sensor 25 to and fro so that the sensor describes a path corresponding to the sawtooth pattern when the pipe 46 turns in relation to the pipe 45. The higher the velocity of the pipes in relation to each other, the higher frequency in turning the arm 8 to and fro is required by the motor 7. In case of a difference between the programmed movement of the real arm and the corresponding movement, converted into scanning, of the redundant arm 8, the sensor 24 immediately detects an error and the motors are made currentless according to the schedule in FIG. 3.

The described concept for high safety robot control can of course be implemented in many different ways. A stepping motor can e.g. be used for the redundant motor, in which case the servo will be of another type. If a linear movement is to be monitored, the contact point has to be moved with a translational movement, e.g. with means of a worm transmission or a belt transmission. In order to obtain the same dynamics in the transfer function between the servo reference and movement of the redundant arm and between servo reference and movement of the real axle, model-based variable filters can be used in the redundant servo. If it desired to increase the sensibility of the monitoring, e.g. at lower velocity, the redundant motor can be controlled with a variable reference offset signal in position so that the redundant arm drives e.g. the point electrodes 56 and 57 in FIG. 8 closer to the edge of the metal surface.

Figure 10:
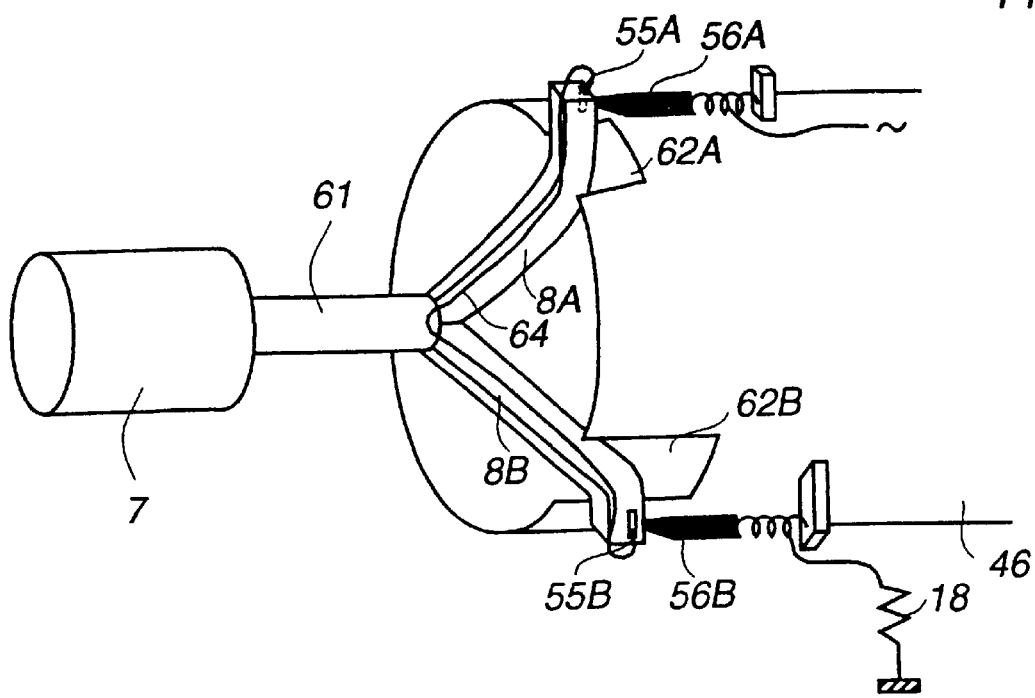
FIG. 10 is a view illustrating a detection arrangement with series connected contact points.

So far only 1 contact point has been used for each electrical circuit. However, several contact points can be used, either series of parallel connected. By series connection of the contact points according to the example in FIG. 10, the circuit breaking function of the contact points will be even safer. According to FIG. 10 the redundant motor 7 drives two redundant arms 8A and 8B via the axle 61. In the end of these arms, there is a conducting surface, 55A and 55B, respectively, against which the electrodes 56A and 56B are pressed. These electrodes are located on the pipe 46, which is turned by the real motor. Between the conducting surfaces 55A and 55B there is a conductor 64, which makes that current supply is obtained to the breaker coil 18 when the redundant arms 8A and 8B move synchronously with the pipe 46. When an error occurs, the electrodes 56A and 56B will get outside the surfaces 55A and 55B, respectively, where the redundant arms are electrically insulating. Through the slits 62A and 62B the redundant arms 8A and 8B will strike the pipe 46 before the electrodes 55A and 55B get outside the insulating surface of the redundant arms around the conducting contact point.

Figure 11:
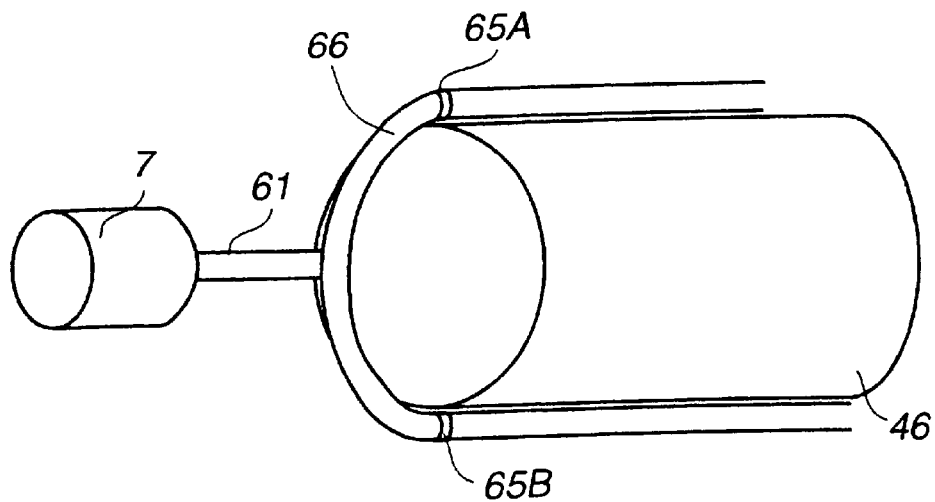
FIG. 11 is a view illustrating a detection arrangement with pneumatic realization of contact points.

Instead of using an electric circuit for manoeuvring breakers and brakes, a pneumatic circuit can be used. In that case, with the arrangement in FIG. 10, the electrodes 56A and 56B and the conducting surfaces 55A and 55B can be replaced by pneumatic pipe couplings 65A and 65B and the conductor 64 by a tube or a pipe 66, see FIG. 11.

Figure 12:
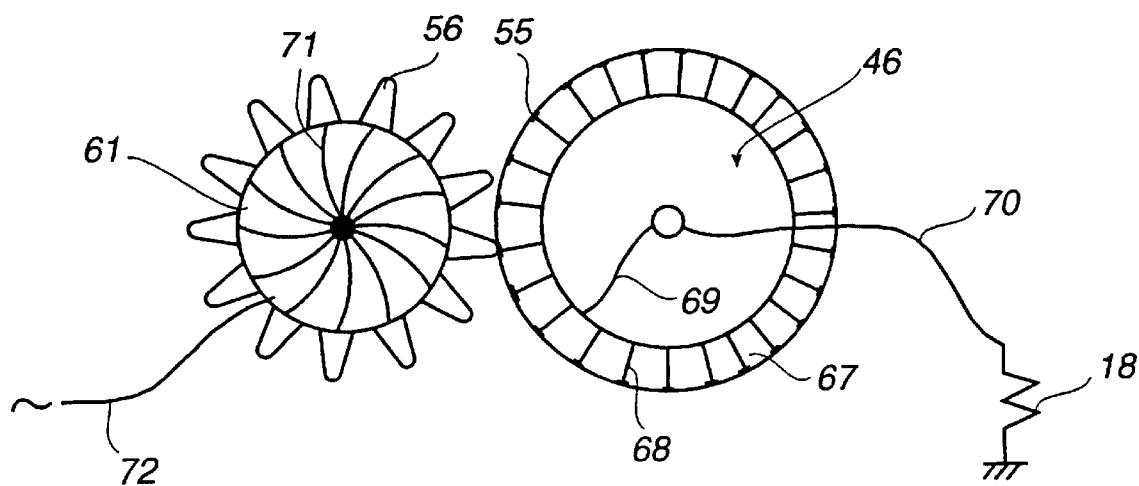
FIG. 12 is a view of a detection arrangement illustrating change of contact points during movement of the driven element and the redundant element.

Of course, more than two contact points can also be used and it is also possible to change contact points when the real arm is moving, which is illustrated in FIG. 12. The pipe 46 is here seen in cross-section and there is a number of contact surfaces 55 on the periphery thereof, which contact surfaces have an insulating surrounding in the form of an insulating soft layer 67. The contact surfaces 55 are electrically connected to the breaker coil 18 via the conductors 68, 69 and 70. To the left of the pipe 46 there is a pipe 61, which is driven in rotation by the redundant motor (not shown). On the periphery of this pipe 61, there are a number of electrodes 56 with the same mutual distance as the distance between the contact surfaces 55 on the pipe 46. All of the electrodes 56 are electrically connected to the current supply of the breaker coil by the conductors 71 and the conductor 72. When the pipes 61 and 46 are synchronously driven in rotation, at least one electrode 56 will always be in contact with a contact surface 55, so that the breaker coil receives its current supply. If any error occurs, the electrode 56 which is in contact position will slide out into the insulating material 67 and the breaker will cut of the motor.

Figure 13:
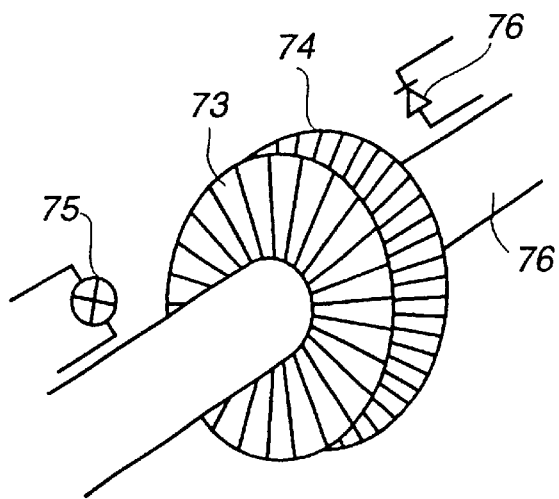
FIG. 13 is a view of a detection arrangement based on moire-technique for error detection.

If a large number of contact points are used a moire-like technique is obtained. In FIG. 13 it is shown how this can be used. The real motor turns the axle 46, whereas the redundant motor turns the axle 61. The disc 73 with one of the moire-patterns is provided on the axle 61 and the disc 74 with the other moire-pattern is provided on the axle 46. The simplest way to carry out moire-patterns is to let them be identical, which causes fade-out at a relative turning of half a pattern partition. For detection of the moire-pattern, one or several light sources 75 and one or several photodetectors 76 are used.

Figure 14:
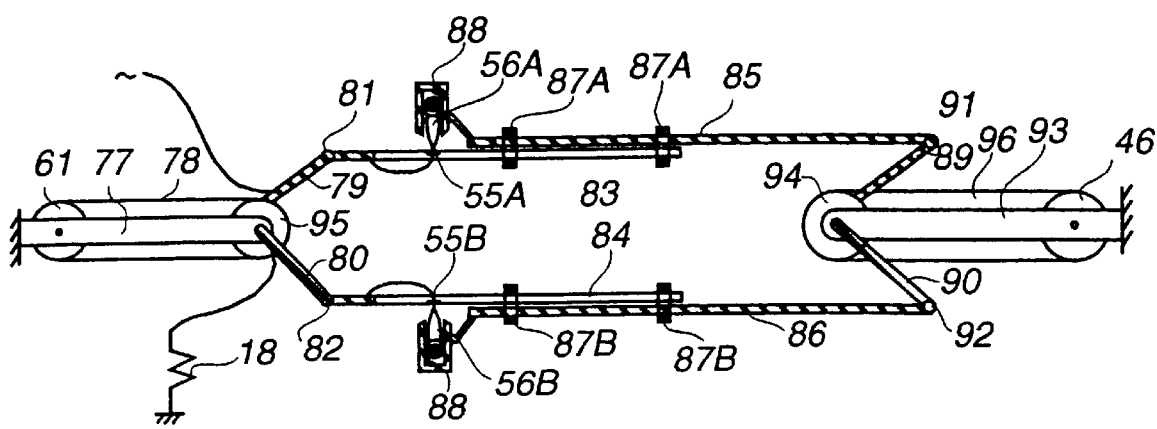
FIG. 14 is a view of a detection arrangement comprising a linkage system for error detection.

For the sake of completeness, it is shown in FIG. 14 that it is also possible to use a linkage system for obtaining contact points between the real robot arm and the redundant arm. Consequently, FIG. 14 shows how the real robot axle 46 is connected with a linkage system to the redundant axle 61. The axle 46 drives a wheel 94 via the belt 96, which wheel is journalled in bearings in the beam 93. The wheel 94 rotates two rods 89 and 90, which are mounted on each side of the wheel 94 and connected to the linkage arms 85 and 86 via the hinges 91 and 92. In a corresponding way, the redundant axle 61 drives the linkage arms 83 and 84 via the belt 78, the wheel 95, the rods 79 and 80 and the hinges 81 and 82. The linkage arms 83 and 85 are coupled together by the bearings 87A, which make that the two linkage arms can move longitudinally in relation to each other. In the same way, the bearings 87B couple together the linkage arms 84 and 86. When the axles 46 and 61 are rotating synchronously, the distances between the bearings 81 and 91 and 82 and 92, respectively, will be constant owing to that the length of the rod 79 is the same as the length of the rod 89, and the length of the rod 80 the same as the length of the rod 90. If a deviation from synchronism occurs, at least one of the distances mentioned above will however change, which results in that at least one of the contact points 55A/56A and 55B/56B, respectively, will be broken. The angle between the rods 89 and 90 has to be the same as the angle between 79 and 80, and preferably in the vicinity of 90°, since this results in that at least one of the linkages will have to change its length when the synchronism is lost.

Figure 15:
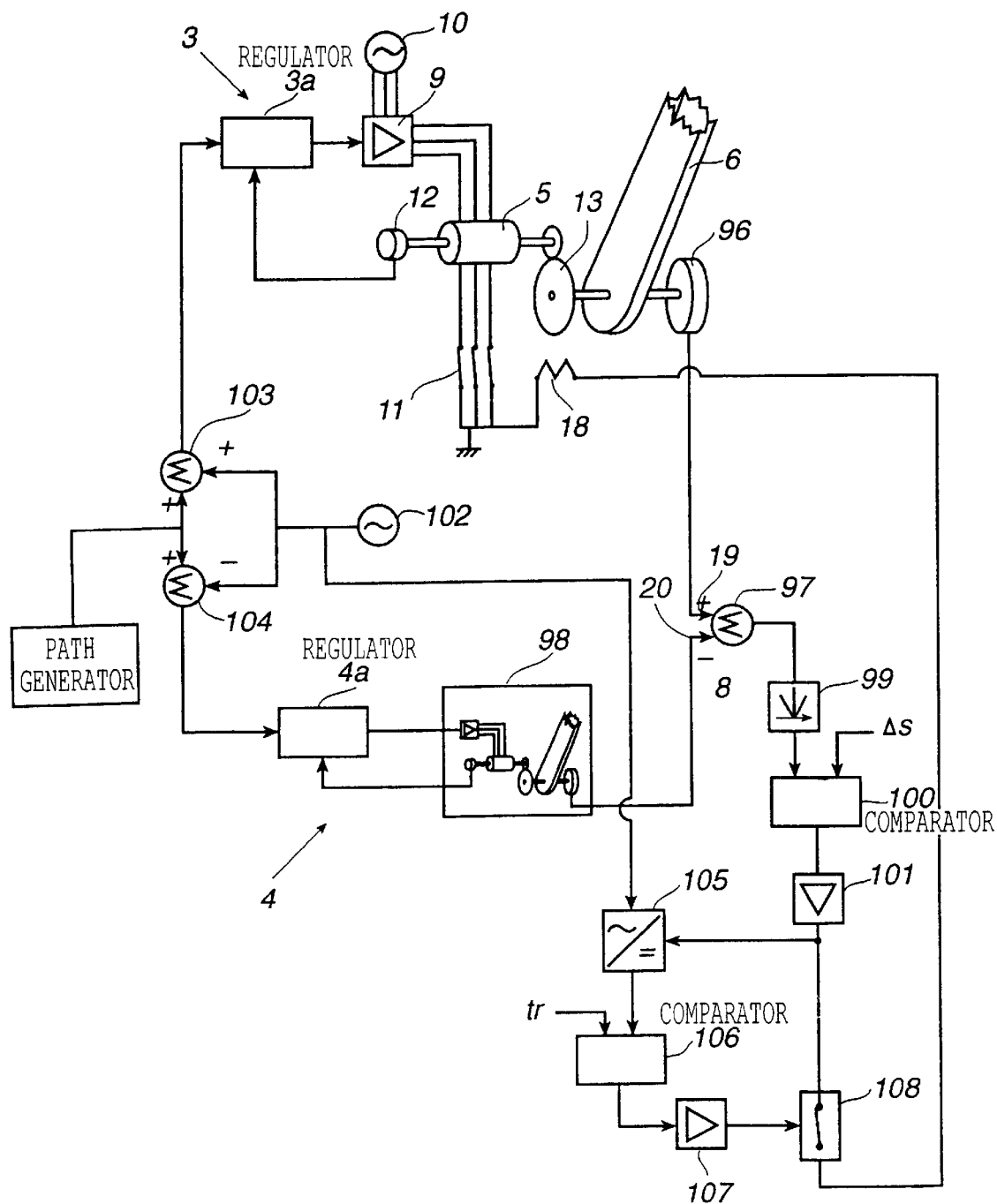
FIG. 15 is a view of a monitoring device, where the safety system is implemented with simulated contact point.

Finally, the possibility of using a simulated contact point is shown in FIG. 15. The upper part of the figure is the same as in FIG. 1, but instead of a physical contact point 19/20 between the real arm 6 and the redundant arm 8, a simulated contact point 97 is used. In this contact point 97 the position of the real arm is obtained from the angle sensor 96, and the position of the redundant arm from a simulated redundant arm with associated motor and driving electronics in the module 98. In order to obtain, in the normal case, the same transfer function between path generator and real arm movement as between path generator and movement of simulated redundant arm, the simulated redundant arm module 98 is given essentially the same dynamic characteristics as the real arm. The output signal from the contact point simulator 97 is supplied to an absolute value function 99, the output of which is compared with the value ΔS in the comparator 100. ΔS simulates half the width of the contact surface in the physical contact point. When the output from 99 exceeds the value ΔS, the comparator will break the current supply to the coil 18 via the driving circuit 101 and the motor 5 will be made currentless. In order to increase the safety in the system, the function generator 102 generates a monitor signal, at one or several frequencies, with a repetitive wave form shape.

This signal is supplied to the input of the servo 3 via the summator 103 and the input of the servo 4 via the subtractor 104. The frequency of the monitor signal can be varied so that it will not come at a frequency where the arm dynamics has a low transmission, e.g. at zero position frequencies. By supplying monitor signals to servo 3 and 4 with different phase, the transmitted monitor signals on the input of the subtractor 97 will have different phase, and a monitor signal component. will also be obtained on the output of the subtractor 97. The circuits 99–101 are then constructed in such a way that they let through the monitor signal when they are working, and the monitor signal will function as a test signal for these circuits. On the output from the driving circuit 101, the monitor signal is detected by the phase-sensitive detector 105, which generates an output signal proportional to the amplitude of the monitor signal on the output of the circuit 101. The output signal from the detector 105 is supplied to a comparator 106, and if the level is higher than a threshold level $t_r$ the driving circuit 107 will hold the relay 108 drawn. If, however, an error occurs in the real system as well as the redundant system, or if an error occurs in any of the circuits 97, 99, 100 or 101, the relay 108 will be opened.

It is pointed out that all the electronic functions can be doubled or trebled, the later in order to make decisions of the type 2 out of 3. In order to obtain the highest possible safety, different functions or the same functions can be implemented in different hardwares, battery backup can be used etc.

What is claimed is:

1. A device for monitoring an operation of a driving arrangement comprising at least one servo mechanism, which includes a regulator, a driving motor controlled by this regulator and an element which can be set in motion by the driving motor, a detection arrangement for detecting deviations between intended and actual movement positions of the element and an operation inhibiting and/or alarming arrangement for inhibiting the operation of the driving arrangement and/or starting an alarm when impermissible deviations have been established by the detection arrangement, the device comprising a redundant driving arrangement, which comprises at least one redundant servomechanism, including a redundant regulator, a redundant driving motor controlled by this redundant regulator and a redundant element which can be set in motion by this redundant driving motor, wherein the regulator and the redundant regulator are connected to an arrangement delivering control information for imparting to the element and the redundant element same movements or movements having a predetermined relation to each other, and that the detection arrangement is arranged to detect deviations concerning the relative position or movements of the element, or an object connected thereto, and the redundant element.

2. A device according to claim 1, wherein the detection arrangement comprises contact members in contact with each other in a contact point, which contact members detect deviations between the element which can be set in motion by the driving motor and the redundant element.

3. A device according to claim 2, wherein the detection arrangement comprises electronic circuits or a computer for obtaining a contact point by comparison between an output signal from an angle or position sensor, connected to the element to be monitored, and an output signal from members, comprised in the detection arrangement, being arranged to emit an output signal corresponding to a position of the redundant element.

4. A device according to claim 3, wherein the output signal from the detection arrangement represents a simulation of the redundant driving motor and the redundant element driven by said motor, which simulation has been obtained by electronic circuits or one or several computers.

5. A device according to claim 3, wherein the simulation of the redundant driving motor is dimensioned for obtaining same dynamic characteristics as the driving motor with associated elements which can be set in motion by said motor.

6. A device according to claim 3, wherein the detection arrangement comprises detection members in a form of angle or position sensors associated with the element and the redundant element, respectively, and a difference former connected to these sensors, and an output signal from this difference former is supplied to a comparator, a comparating signal of which simulates a half of a permitted relative movement or position differential between the element and the redundant element or objects connected to these.

7. A device according to claim 6, further comprising a signal generator configured to generate a monitor signal to the regulator in the servomechanism for the element and to supply a monitor signal offset in phase to the regulator in the servomechanism for the simulated redundant element, and the detection arrangement is arranged to use this monitor signal for securing that no errors will ensue simultaneously as concerns driving of the element as well as the simulated redundant element and that no errors will ensue in the electronic circuits included in the difference former, the comparator, and the detection arrangement.

8. A device according to claim 2, wherein the members being in contact with each other in the contact point comprise electrically conducting members, one member of which, directly or via transmissions, follows movements of the element, and a second member of which, directly or via transmissions, follows movements of the redundant element.

9. A device according to claim 8, wherein at least one of said electrically conducting members is surrounded by a medium, being insulating to electric current, in such a way that a deviation in movements between the element and the redundant element results in that that electrical contact in the contact point is interrupted and that the driving motor is disengaged and/or is braked by the operation inhibiting arrangement.

10. A device according to claim 8, wherein one of the electrically conducting members comprises a conducting surface surrounded by an insulating surface, and two other conducting members, connected in series, are pressed against the conducting surface so as to close an electric circuit, in which circuit a breaker for the driving motor is included.

11. A device according to claim 8, wherein electrically conducting members in to or more contact points are connected in series.

12. A device according to claim 2, wherein plural contact points are provided and an arrangement is such that a successive change of contact points takes place during relative movements of the element and the redundant element.

13. A device according to claim 2, wherein at least one contact point is located on a linkage system between the element and the redundant element.

14. A device according to claim 2, wherein the contact point is mechanically connected to an electric contact.

15. A device according to claim 2, wherein the contact point is mechanically connected to a holding mechanism for a brake or an electric breaker included in the operation inhibiting arrangement.

16. A device according to claim 2, wherein said contact point is formed of a pneumatic coupling.

17. A device according to claim 16, further comprising plural measuring points and moirè-technique for measuring deviations between the movements of the element and the redundant element.

18. A device according to claim 2, wherein said contact point is formed between a sensor and a sensor target and the detection arrangement comprises a non-contact measuring system.

19. A device according to claim 18, wherein the measuring system utilizes inductive, capacitive, optical, or ultrasonically based sensors.

20. A device according to claim 18, wherein the redundant driving arrangement is arranged to make the redundant element oscillate or a sensor for the redundant element is arranged to be electrically modulated at least one frequency, and the detection arrangement is arranged to use the signal/signals, thus obtained, as monitor signal/signals for testing the monitoring device.

21. A device according to claim 18, wherein the contact point is moveable and is defined by a pattern arranged to move connected to the movements of either the element or the redundant element.

22. A device according to claim 21, wherein a sensor in the redundant element is arranged to be moved in a path corresponding to said pattern when the movements of the element and the redundant element are synchronized.

23. A device according to claim 2, further comprising a signal generator configured to generate a monitor signal to the regulator in the servomechanism for the element and to the regulator of the redundant servomechanism for the redundant element, and that the monitor signal, transmitted in two ways, is used for monitoring if errors ensue simultaneously as concerns driving of the element and the redundant element.

24. A device according to claim 2, wherein the contact point is electromagnetically connected to driving circuits for the driving motor of the element and/or a brake for said motor.

25. A device according to claim 1, wherein the driving arrangement forms part of a manipulator of an industrial robot, and that the element which can be set in motion by the motor comprises an arm of the manipulator.

* * * * *